US009971967B2

(12) United States Patent
Bufe, III et al.

(10) Patent No.: US 9,971,967 B2
(45) Date of Patent: May 15, 2018

(54) GENERATING A SUPERSET OF QUESTION/ANSWER ACTION PATHS BASED ON DYNAMICALLY GENERATED TYPE SETS

(71) Applicant: International Business Machines Corporation, Armonk, NY (US)

(72) Inventors: John P. Bufe, III, Cambridge, MA (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 14/103,981

(22) Filed: Dec. 12, 2013

(65) Prior Publication Data

US 2015/0169544 A1    Jun. 18, 2015

(51) Int. Cl.
*G06N 5/02*    (2006.01)

(52) U.S. Cl.
CPC ...................................... *G06N 5/02* (2013.01)

(58) Field of Classification Search
CPC ................................ G06F 17/27; G06F 17/30
USPC .............................................................. 704/9
See application file for complete search history.

(56) References Cited

U.S. PATENT DOCUMENTS

| 8,275,803 B2 | 9/2012 | Brown et al. | |
| 2003/0204399 A1* | 10/2003 | Wolf et al. | 704/251 |
| 2004/0117189 A1* | 6/2004 | Bennett | G06F 17/27 |
| | | | 704/270.1 |
| 2007/0067293 A1 | 3/2007 | Yu | |
| 2009/0112828 A1* | 4/2009 | Rozenblatt | G06F 17/30672 |
| 2010/0063797 A1 | 3/2010 | Cong et al. | |
| 2012/0303356 A1* | 11/2012 | Boyle et al. | 704/9 |
| 2013/0212109 A1* | 8/2013 | Evancich | G06F 17/30598 |
| | | | 707/740 |
| 2013/0304758 A1* | 11/2013 | Gruber | G06F 17/30976 |
| | | | 707/769 |
| 2014/0181983 A1* | 6/2014 | Hart | G06F 21/604 |
| | | | 726/26 |

OTHER PUBLICATIONS

Yuan et al.; "Watson and healthcare"; Apr. 12, 2011; Copyright IBM Corporation 2011; p. 1-11.*
Kate et al., "Learning to Transform Natural to Formal Languages," Proceedings of the Twentieth National Conference on Artificial Intelligence (AAAI-05), Pittsburgh, PA, Jul. 2005, pp. 1062-1068.

* cited by examiner

*Primary Examiner* — Shreyans A Patel
(74) *Attorney, Agent, or Firm* — VanLeeuwen & VanLeeuwen; Reza Sarbakhsh

(57) ABSTRACT

An approach is provided for generating supersets of Q/A action paths based on dynamically generated type sets. In the approach, a corpus of knowledge that is used by the QA system is analyzed. The analyzing is performed according to a natural language processing (NLP) of a number of key words that have been found to exceed an expected frequency, such as a frequency found in general language usage. Runtime code is generated by utilizing the key words. The generated runtime code is able to provide answers from the corpus of knowledge, such as by being in a natural language question or in a structured query language expression, with the provided answers being related to one or more predicted questions.

20 Claims, 6 Drawing Sheets

GENERATING A SUPERSET OF QUESTION/ANSWER ACTION PATHS BASED ON DYNAMICALLY GENERATED TYPE SETS

BACKGROUND OF THE INVENTION

Adapting a system to a new domain generally requires generating a glossary of keywords relevant to the new domain. This is usually performed with some amount of manual effort. In a Question/Answer (QA) system, a further manual process is performed to map this glossary of terms into actions that generate desired output. The desired output might include one or more queries that can be run against a pre-existing database within which the desired answer resides. Each adaptation to a new domain requires further manual steps.

SUMMARY

An approach is provided for generating supersets of Q/A action paths based on dynamically generated type sets. In the approach, a corpus of knowledge that is used by the QA system is analyzed. The analyzing is performed according to a natural language processing (NLP) of a number of key words that have been found to exceed an expected frequency, such as a frequency found in general language usage. Runtime code is generated by utilizing the key words. The generated runtime code is able to provide answers from the corpus of knowledge, such as by being in a natural language question or in a structured query language expression, with the provided answers being related to one or more predicted questions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
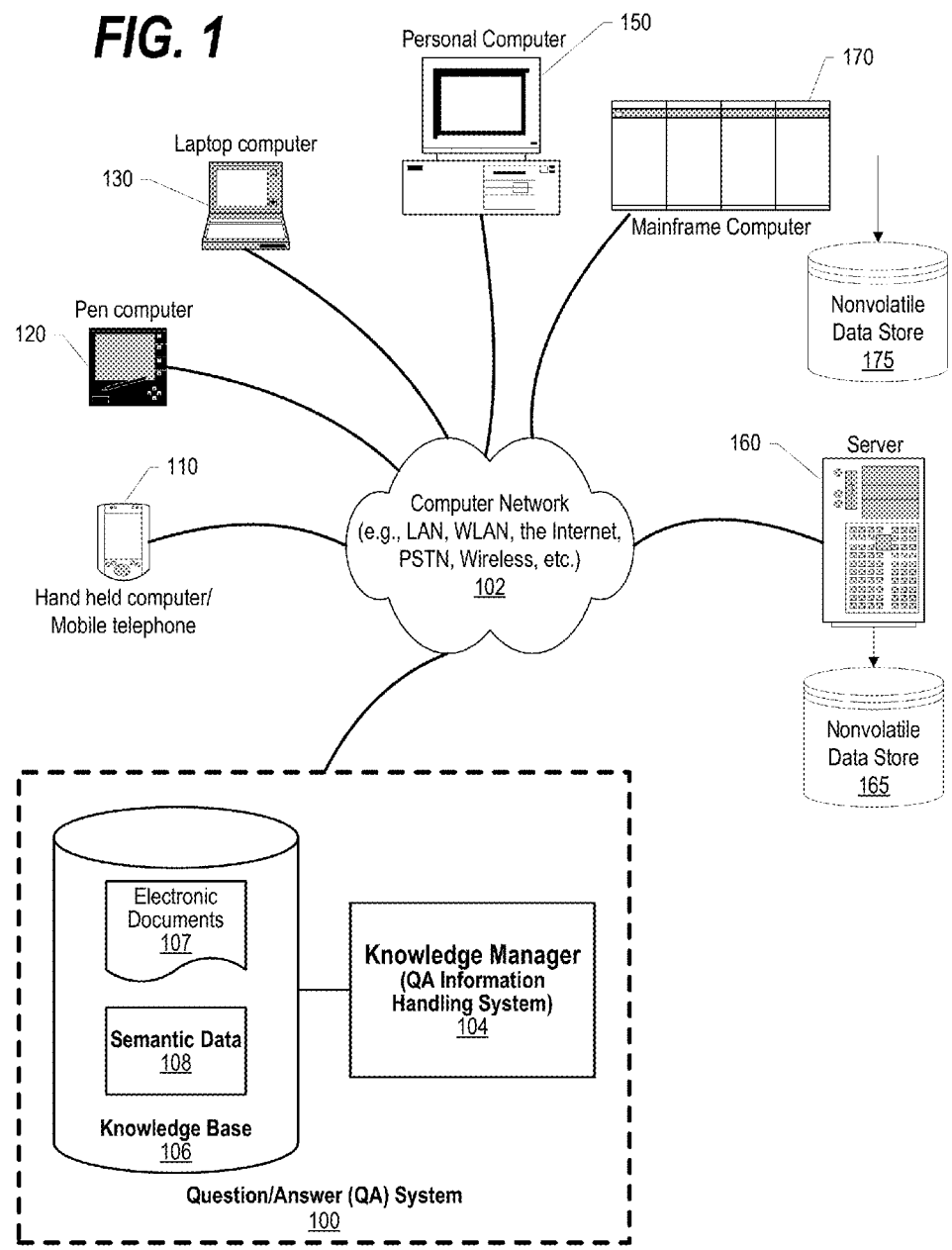
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
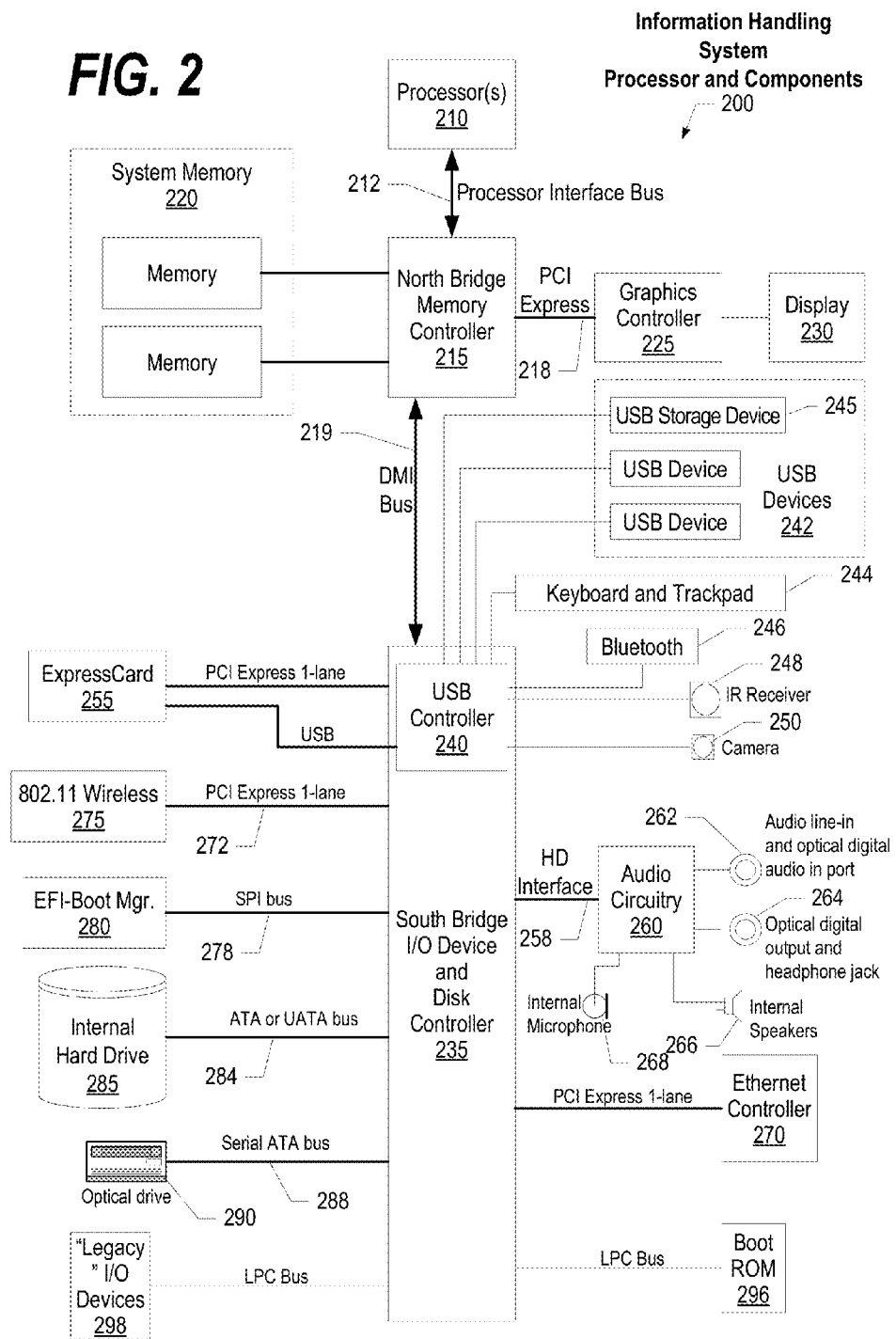
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that can be executed on an information handling system, to generate question-answer paths for a QA system. In the approach, a corpus of knowledge that is used by the QA system is analyzed. The analyzing is performed according to a natural language processing (NLP) of a number of key words that have been found to exceed an expected frequency, such as a frequency found in general language usage. Runtime code is generated by utilizing the key words. The generated runtime code is able to provide answers from the corpus of knowledge, such as by being in a natural language question or in a structured query language expression, with the provided answers being related to one or more predicted questions.

In one embodiment, a structured database is constructed from the corpus of knowledge. The structured database is included in the corpus of knowledge and facilitates searching for answers to the questions using a runtime code that includes a structured query language expression. In a further embodiment, a user interface (UI) is provided that allows a user, such as a domain expert, to input a question; and responsive to receiving the question by the UI, utilizing the runtime code to formulate the structured query language expression. The structured database is then queried using the structured query language expression to retrieve responsive information. The responsive information is used to formulate a possible answer and the possible answer is presented to the user. In another further embodiment, a set of data sources are selected from the corpus of knowledge and each relate to a common domain of information. Words are extracted from the set of data sources and the process calculates the frequency that each word is used in the domain as well as its frequency in general usage. The domain-usage frequency of the word is compared with the general-usage frequency of the word to identify a set of the words that are key words. The identification of the key words based on the comparison revealing that the domain-usage frequency of the key words is statistically significantly higher than the general-usage frequency of the key words. In a still further embodiment, schemas corresponding to the structured database are searched for the identified key words. A selected schema where a selected key word is found is used to build the structured query language expression to search for the selected key word in the database table corresponding to the selected schema.

In one embodiment, a natural language question is generated based on the structured query language expression. The generated natural language question to the user at the user interface. The user edits the natural language question the edited natural language question is stored as runtime code that can be processed by the QA system. In one embodiment, the corpus of knowledge includes a first corpus that relates to a first domain of knowledge and a second corpus that relates to a second domain of knowledge. A first set of key words relate to the first corpus and a second set of key words relate to the second corpus, with the first set of key words being different from the second set of key words.

Figure 3:
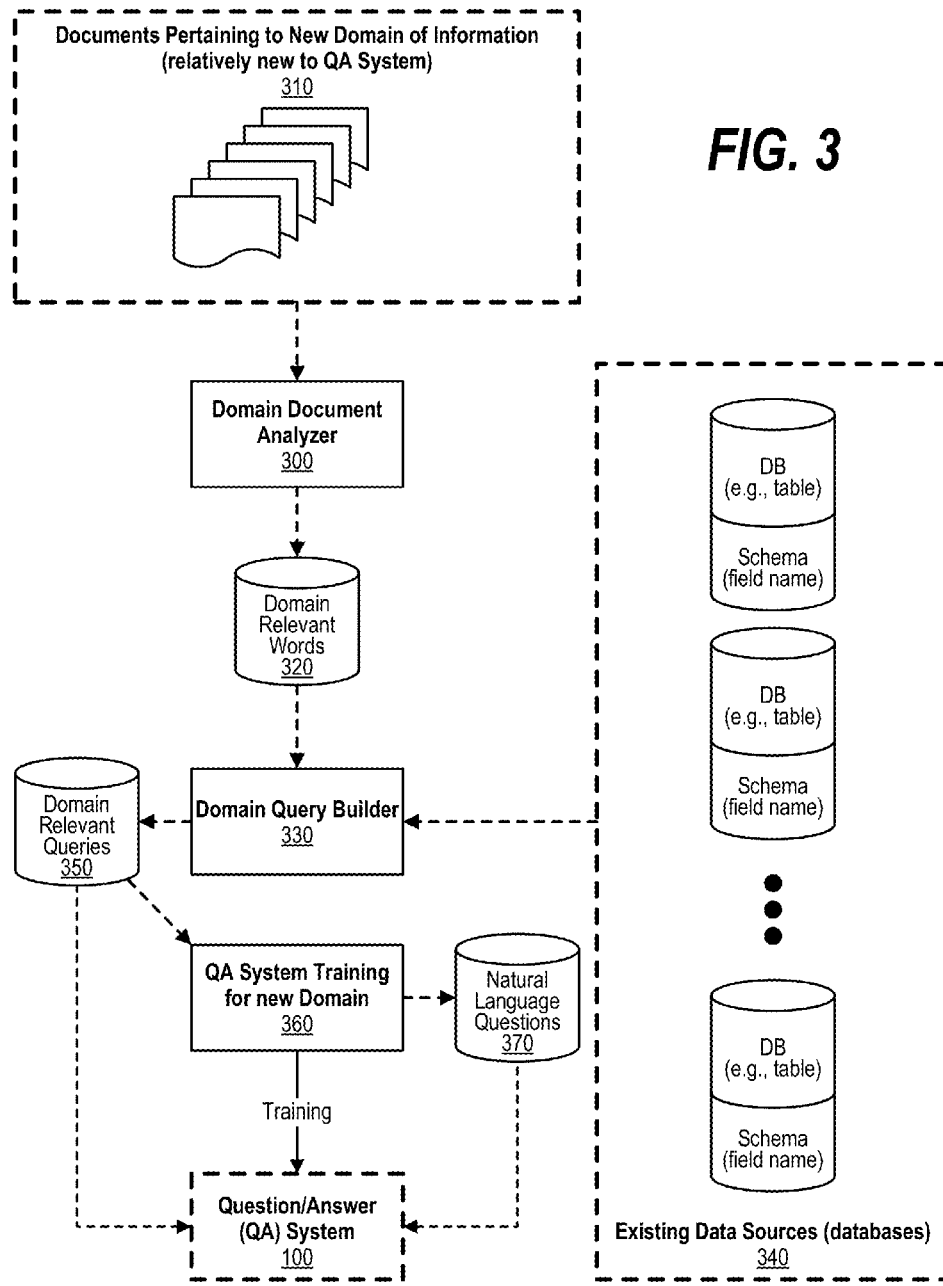
FIG. 3 is a component diagram depicting the various components utilized in generating supersets of Q/A action paths based on dynamically generated type sets.

FIG. 3 is a component diagram depicting the various components utilized in generating supersets of Q/A action paths based on dynamically generated type sets. Domain document analyzer 300 is a process that analyzes domain of documents 310 in order to generate domain relevant key words that are stored in data store 320. Documents 310 are a set of data sources that are included in the corpus of knowledge used by the QA system. In one embodiment, these documents are relatively new to the QA system and, therefore, represent a new domain for the building of questions that are used to train the QA system.

Domain query builder 330 uses the set of key words from data store 320 to analyze metadata regarding existing data sources 340. In one embodiment, the existing data sources are databases, such as structured databases, and the metadata are database schemas that include data related to fields found in data sources, such as database tables. The result of domain query builder 330 are domain relevant queries that are stored in data store 350. In one embodiment, the domain relevant queries are runtime code that include structured query language expressions (e.g., SQL expressions, etc.) that can be executed against a structured database.

QA system training (process 360), is performed using domain relevant queries that were previously stored in data store 350. A user interface can be provided allowing a user, such as a domain expert, to work with the domain relevant queries in order to generate natural language questions that are based on the data included in the domain relevant queries. The natural language questions are stored in data store 370.

QA system 100 is trained using either, or both, the domain relevant queries from data store 350 as well as the natural language questions from data store 370. The domain relevant queries from data store 350 can be used to train the QA system using system corpus that is maintained in structured data sources, such as in relational database tables managed by a relational database management system (DBMS). The natural language questions from data store 370 can be used to train the QA system using system corpus that is maintained in unstructured data sources, such unstructured documents.

Figure 4:
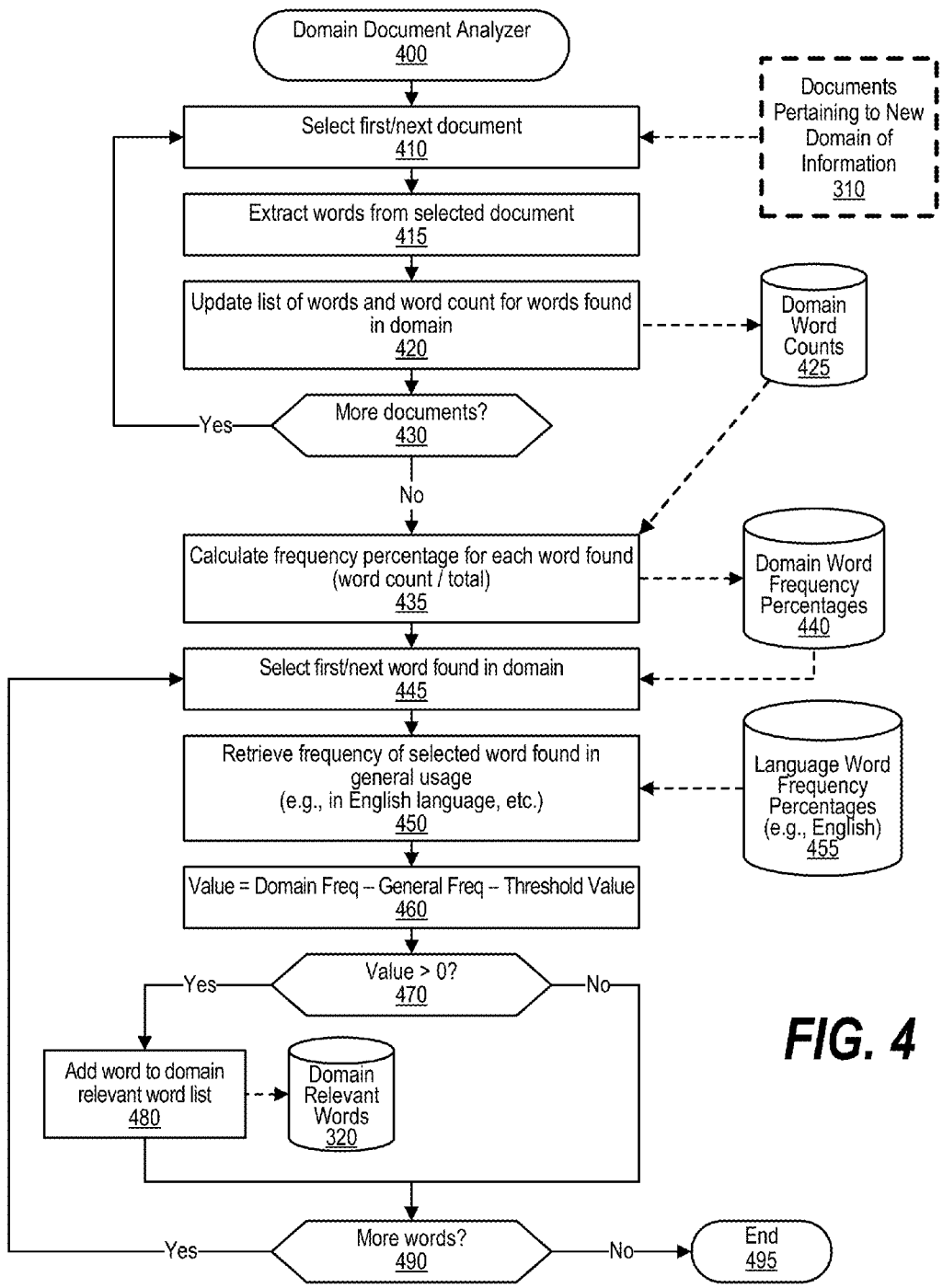
FIG. 4 is a depiction of a flowchart showing the logic used by a domain document analyzer that identifies words that are relevant to the domain.

FIG. 4 is a depiction of a flowchart showing the logic used by a domain document analyzer that identifies words that are relevant to the domain. Processing performed by the domain document analyzer commences at 400 whereupon, at step 410, the process selects the first data source (e.g., document, etc.) pertaining to the domain from data store(s) 310 used to store such data sources/documents. At step 415, the process extracts the words found in the selected document. At step 420, the process updates the list of words that have been found in the documents related to the domain. If a first occurrence of a word is encountered, the word is added to data store 425 and its count is initialized to one (1). If the word is already included in data store 425, then its count is incremented when another occurrence of the word is found and the incremented count is stored in data store 425. After all of the words have been processed and counted from the first data source, a decision is made by the process as to whether there are additional documents, or data sources, related to the domain to process for key words (decision 430). If there are additional documents, then decision 430 branches to the "yes" branch which loops back to select the next document from data store(s) 310 and the words from the newly selected document are counted as described above. This looping continues until all of the documents have been processed, at which point decision 430 branches to the "no" branch for further processing.

At step 435, a domain-usage frequency is calculated for each word stored in data store 425. The domain-usage frequency is the frequency (e.g., percentage, etc.) that each word is used in the documents processed from data store(s) 310. In one embodiment, the domain-usage frequency is calculated by dividing the word count of each word by the total number of words encountered in all of the documents. The domain-usage frequency of all of the words is stored in data store 440. The process next analyzes the words in order to identify "key words" that are found to be statistically relevant to the domain.

At step 445, the first word (and its domain-usage frequency) is selected from data store 440. At step 450, the general-usage frequency of the selected word is retrieved from data store 455, such as a data store that lists the frequency of all words used in the English language, etc. At step 460, the process performs a calculation to determine whether the selected word occurs in the domain related documents at a statistically significantly higher rate than in general usage. In one embodiment, the calculation of the value is made by subtracting the general-usage frequency of the word from the domain-usage frequency of the word and then subtraction threshold value, such as two percent. The threshold value may change based on the domain and determines the statistically significant rate to apply in the analysis. A decision is made by the process as to whether the selected domain-usage frequency of the selected word is statistically significantly higher than the general-usage frequency of the same word (decision 470). If the selected domain-usage frequency of the selected word is statistically significantly higher than the general-usage frequency of the same word, then decision 470 branches to the "yes" branch whereupon, at step 480, the selected word is identified as a "key word" for the domain and included in the list of domain relevant words which is stored in data store 320. On the other hand, if the selected domain-usage frequency of the selected word is not statistically significantly higher than the general-usage frequency of the same word, then decision 470 branches to the "no" branch bypassing step 480 and the word is not identified as a key word.

A decision is made by the process as to whether there are more words from data store 440 to process to see if the words are "key words" (decision 490). If there are more words to process, then decision 490 branches to the "yes" branch which loops back to step 445 to select and process the next word from data store 440. This looping continues until all of the words from data store 440 have been processed, at which point decision 490 branches to the "no" branch and domain document analyzer processing ends at 495.

Figure 5:
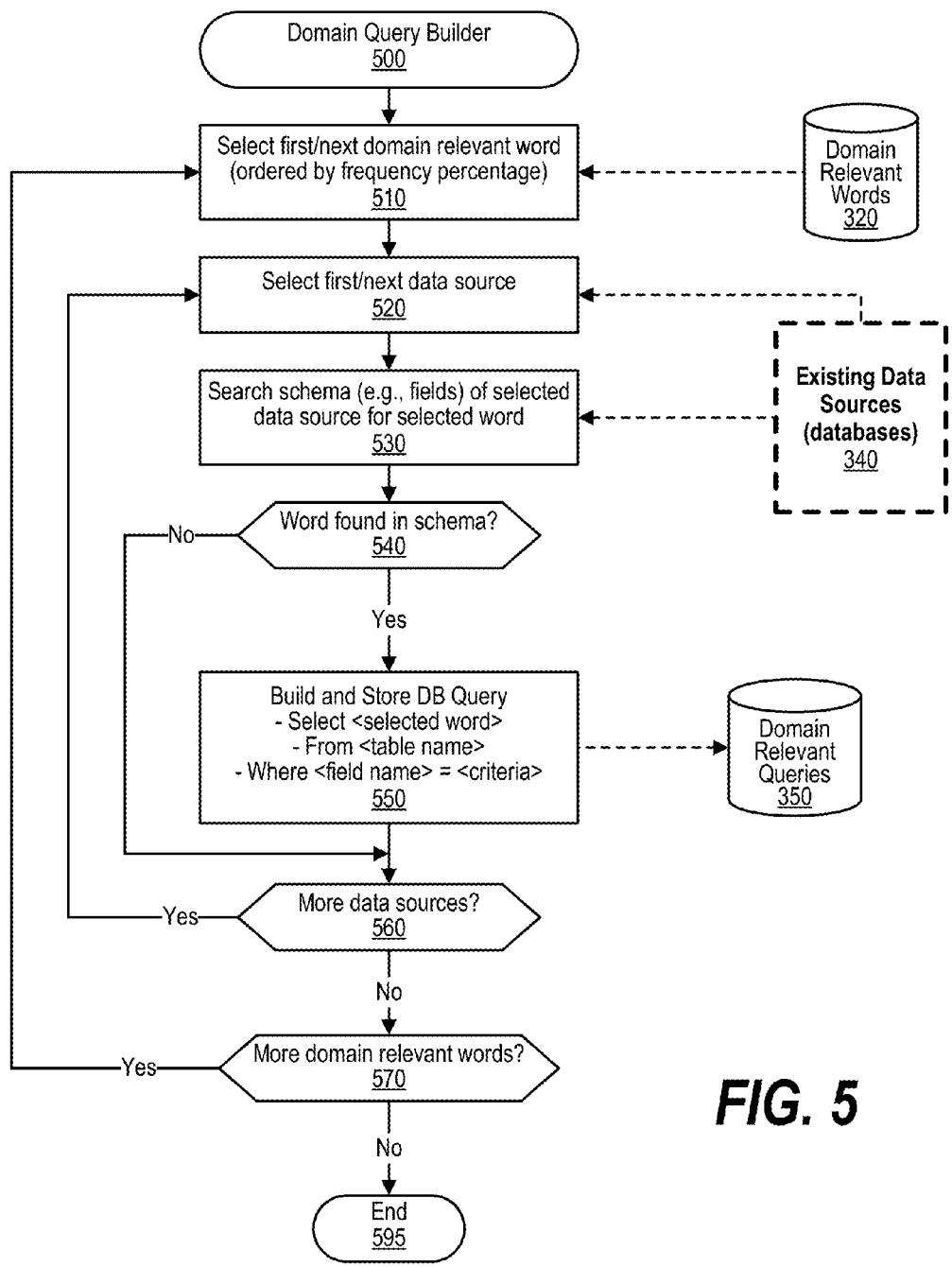
FIG. 5 is a depiction of a flowchart showing the logic used by a domain query builder that uses the identified relevant domain words to build domain relevant queries.

FIG. 5 is a depiction of a flowchart showing the logic used by a domain query builder that uses the identified relevant domain words to build domain relevant queries. Domain query builder processing commences at 500 whereupon, at step 510, the process selects the first word from data store 320 where the list of "key words" found to be domain relevant words were stored by the process shown in FIG. 4. In one embodiment, the domain relevant words (key words) are sorted by their respective domain-usage frequency prior to the processing shown in FIG. 5.

At step 520, the process selects the first data source, such as a database source, from existing data sources data store 340. Metadata, such as a database schema, related to the selected data source is searched for the selected key word. The metadata includes a list of field names found in the data sources. A decision is made by the process as to whether the selected word was found in the selected schema or metadata (decision 540). For example, the select word might have been found as part of a field name in the selected metadata, such as a schema, related to a table in a database. If the selected word was found in the selected metadata, then decision 540 branches to the "yes" branch whereupon, at step 550, a runtime code is generated with the runtime code being a structured query language expression. A "select" statement is built to select from the column name (field name) that matches the selected word with the column name being from a table where the column exists. The table name is extracted through the metadata. In addition, a "where" clause is included in the "select" statement to search for records where the field name that matches the selected word matches a criteria. In one embodiment, the criteria is supplied by a user, such as a domain expert. The generated runtime code, in this case a structured query language expression, is stored in data store 350.

A decision is made by the process as to whether there are additional data sources (e.g. databases, schemas, etc.) to process (decision 560). If there are additional data sources to process, then decision 560 branches to the "yes" branch which loops back to step 520 to select and process the next data source from data stores 340 as described above. This looping continues until there are no more data sources to process, at which point decision 560 branches to the "no" branch.

A decision is made by the process as to whether there are additional key words (domain relevant words) stored in data store 320 to process (decision 570). If there are additional key words to process, then decision 570 branches to the "yes" branch which loops back to step 510 to select and process the next key word from data store 320 as described above. This looping continues until there are no more key words to process, at which point decision 570 branches to the "no" branch and the domain query builder process ends at 595.

Figure 6:
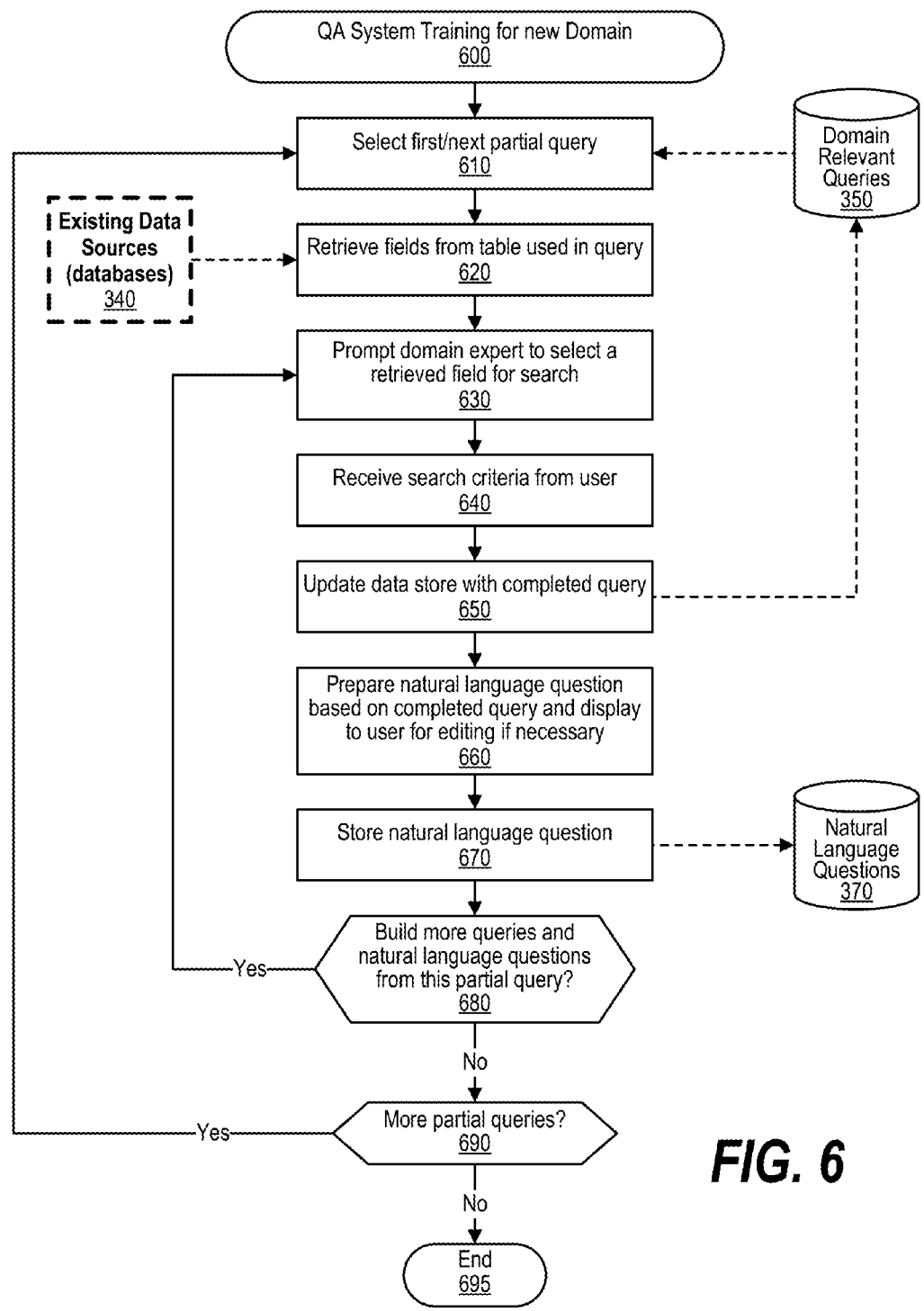
FIG. 6 is a depiction of a flowchart showing the logic during QA System training performed by a domain expert that utilizes the domain relevant queries.

FIG. 6 is a depiction of a flowchart showing the logic during QA System training performed by a domain expert that utilizes the domain relevant queries. The QA system training process used to train the system for a new domain commences at 600 whereupon, at step 610, the process selects a first runtime code, in this case a partial query, from data store 350. The query was previously stored in data store 350 by the Domain Query Builder shown in FIG. 5.

Returning to FIG. 6, at step 620, the process retrieves the fields (field names) from the database table that is referenced in the selected partial database query. At step 630, the process uses a user interface to prompt a user, such as a domain expert, to select one of the retrieved fields to use the selected field in the database query. At step 640, the user provides a search criteria at the user interface with the search criteria relating to the selected field for the search. At step 650, the process updates the generated runtime code with the runtime code being a completed structured query language expression.

At step 660, the process prepares a natural language question that is based on the completed query using, for example, the domain-based key word and the search criteria provided by the user. The prepared natural language question is displayed to the user at the user interface and the user, such as a domain expert, can edit the natural language question as needed. At step 670, the natural language question is stored in data store 370 with the natural language question also being a generated runtime code adapted to provide answers from the corpus of the QA system with the provided answers relating to one or more predicted questions.

A decision is made by the process as to whether to build more queries and natural language questions from the selected partial query (decision 680). This decision might be made in response to the user selecting a command button, such as "build another query/NL question" from the user interface. If the decision is to build another structured query language expression and natural language question from the partial query, then decision 680 branches to the "yes" branch which loops back to gather the information for the next structured query language expression and natural language question and store them in data stores 350 and 370, respectively. This looping continues until no further queries/questions are desired from the partial query, at which point decision 680 branches to the "no" branch.

A decision is made by the process as to whether there are additional partial queries in data store 350 to process (decision 690). If there are additional partial queries in data store 350 to process, then decision 690 branches to the "yes" branch which loops back to select and process the next partial query from data store 350. This looping continues until all of the partial queries stored in data store 350 have been processed, at which point decision 690 branches to the "no" branch and the process ends at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for generating question-answer paths for a Question/Answer (QA) system, the method comprising:

analyzing a corpus of knowledge used by the QA system, wherein the analyzing comprises identifying a plurality of key words included in the corpus of knowledge, wherein the key words occur in the corpus of knowledge at a higher than expected frequency;

generating a runtime code by utilizing the key words, wherein the generated runtime code comprises an initial structured query language expression including a plurality of search fields, and wherein the generated runtime code is adapted to provide answers from the corpus of knowledge, and wherein the provided answers are related to one or more predicted questions;

in response to generating the runtime code, receiving a first user input from a user, the first user input comprising a selected one of the plurality of search fields included in the initial structured query language expression;

in response to receiving the first user input, generating an edited runtime code, wherein the edited runtime code comprises a complete structured query language expression for the selected search field;

generating a natural language question based upon the edited runtime code;

in response to generating the natural language question, receiving a second user input from the user, the second user input comprising one or more edits to the natural language question;

updating the natural language question based on the second user input;

storing the updated natural language question and one or more of the provided answers in a format compatible for processing by the QA system; and training the QA system using the updated natural language question and the one or more of the provided answers, wherein the stored updated natural language question and the one or more of the provided answers comprises a question-answer path utilized by the QA system.

2. The method of claim 1 further comprising:

accessing a structured database from the corpus of knowledge, wherein the structured database is included in the corpus of knowledge and facilitates searching for one or more possible answers to the one or more predicted questions using the runtime code.

3. The method of claim 2 further comprising:

querying the structured database to retrieve responsive information;

utilizing the retrieved responsive information to formulate the one or more possible answers to the one or more predicted questions; and presenting the formulated possible answers to the user.

4. The method of claim 2 further comprising:

selecting a set of data sources included in the corpus of knowledge, wherein the selected set of data sources are related to a common domain of information;

extracting a plurality of words from the set of data sources;

calculating a domain-usage frequency for each of the plurality of words, wherein the domain-usage frequency is the frequency that each of the plurality of words occurs in the set of data sources;

retrieving a general-usage frequency for each of the plurality of words, wherein the general-usage frequency is the frequency that each of the plurality of words occurs in general language usage;

for each of the plurality of words, comparing the domain-usage frequency of the word with the general-usage frequency of the word; and identifying a set of the plurality of words from the plurality of words as the plurality of key words, the identifying based on the comparison revealing that the domain-usage frequency corresponding to each word in the set of the plurality of words is statistically significantly higher than the general-usage frequency corresponding to the respective word.

5. The method of claim 4 further comprising:

searching a plurality of schemas corresponding to the structured database for the plurality of key words;

finding a selected one of the key words in a selected one of the schemas, wherein the selected schema corresponds to a selected database table included in the structured database; and building the initial structured query language expression to search for the selected key word in the selected database table.

6. The method of claim 1 further comprising:

presenting the generated natural language question to the user at a user interface (UI); and receiving the one or more edits, at the UI, from the user to the generated natural language question.

7. The method of claim 1 wherein the corpus of knowledge includes a first corpus that relates to a first domain of knowledge and a second corpus that relates to a second domain of knowledge, wherein the key words include a first set of key words related to the first corpus and second set of key words related to the second corpus, and wherein the first and second sets of key words differ between the two domains.

8. An information handling system comprising:

one or more processors;

a memory coupled to at least one of the processors;

a display; and a set of instructions stored in the memory and executed by at least one of the processors to generate question-answer paths for a Question/Answer (QA) system, wherein the set of instructions perform actions of:

analyzing a corpus of knowledge used by the QA system, wherein the analyzing comprises identifying a plurality of key words included in the corpus of knowledge, wherein the key words occur in the corpus of knowledge at a higher than expected frequency;

generating a runtime code by utilizing the key words, wherein the generated runtime code comprises an initial structured query language expression including a plurality of search fields, and wherein the generated runtime code is adapted to provide answers from the corpus of knowledge, and wherein the provided answers are related to one or more predicted questions;

in response to generating the runtime code, receiving a first user input from a user, the first user input comprising a selected one of the plurality of search fields included in the initial structured query language expression;

in response to receiving the first user input, generating an edited runtime code, wherein the edited runtime code comprises a complete structured query language expression for the selected search field;

generating a natural language question based upon the edited runtime code;

in response to generating the natural language question, receiving a second user input from the user, the second user input comprising one or more edits to the natural language question;

updating the natural language question based on the second user input;

storing the updated natural language question and one or more of the provided answers in a format compatible for processing by the QA system; and training the QA system using the updated natural language question and the one or more of the provided answers, wherein the stored updated natural language question and the one or more of the provided answers comprises a question-answer path utilized by the QA system.

9. The information handling system of claim 8 wherein the actions further comprise:

accessing a structured database from the corpus of knowledge, wherein the structured database is included in the corpus of knowledge and facilitates searching for one or more possible answers to the one or more predicted questions using the runtime code.

10. The information handling system of claim 9 wherein the actions further comprise:

querying the structured database to retrieve responsive information;

utilizing the retrieved responsive information to formulate the one or more possible answers to the one or more predicted questions; and presenting the formulated possible answers to the user.

11. The information handling system of claim 9 wherein the actions further comprise:

selecting a set of data sources included in the corpus of knowledge, wherein the selected set of data sources are related to a common domain of information;

extracting a plurality of words from the set of data sources;

calculating a domain-usage frequency for each of the plurality of words, wherein the domain-usage frequency is the frequency that each of the plurality of words occurs in the set of data sources;

retrieving a general-usage frequency for each of the plurality of words, wherein the general-usage frequency is the frequency that each of the plurality of words occurs in general language usage;

for each of the plurality of words, comparing the domain-usage frequency of the word with the general-usage frequency of the word; and identifying a set of the plurality of words from the plurality of words as the plurality of key words, the identifying based on the comparison revealing that the domain-usage frequency corresponding to each word in the set of the plurality of words is statistically significantly higher than the general-usage frequency corresponding to the respective word.

12. The information handling system of claim 11 wherein the actions further comprise:

searching a plurality of schemas corresponding to the structured database for the plurality of key words;

finding a selected one of the key words in a selected one of the schemas, wherein the selected schema corresponds to a selected database table included in the structured database; and building the initial structured query language expression to search for the selected key word in the selected database table.

13. The information handling system of claim 8 wherein the actions further comprise:
   presenting the generated natural language question to the user at a user interface (UI); and
   receiving the one or more edits, at the UI, from the user to the generated natural language question.

14. The information handling system of claim 8 wherein the corpus of knowledge includes a first corpus that relates to a first domain of knowledge and a second corpus that relates to a second domain of knowledge, wherein the key words include a first set of key words related to the first corpus and second set of key words related to the second corpus, and wherein the first and second sets of key words differ between the two domains.

15. A computer program product stored in a computer readable storage device, comprising computer instructions that, when executed by an information handling system, causes the information handling system to generate question-answer paths for a Question/Answer (QA) system by performing actions comprising:
   analyzing a corpus of knowledge used by the QA system, wherein the analyzing comprises identifying a plurality of key words included in the corpus of knowledge, wherein the key words occur in the corpus of knowledge at a higher than expected frequency;
   generating a runtime code by utilizing the key words, wherein the generated runtime code comprises an initial structured query language expression including a plurality of search fields, and wherein the generated runtime code is adapted to provide answers from the corpus of knowledge, and wherein the provided answers are related to one or more predicted questions;
   in response to generating the runtime code, receiving a first user input from a user, the first user input comprising a selected one of the plurality of search fields included in the initial structured query language expression;
   in response to receiving the first user input, generating an edited runtime code, wherein the edited runtime code comprises a complete structured query language expression for the selected search field;
   generating a natural language question based upon the edited runtime code;
   in response to generating the natural language question, receiving a second user input from the user, the second user input comprising one or more edits to the natural language question;
   updating the natural language question based on the second user input;
   storing the updated natural language question and one or more of the provided answers in a format that compatible for processing by the QA system; and
   training the QA system using the updated natural language question and the one or more of the provided answers, wherein the stored updated natural language question and the one or more of the provided answers comprises a question-answer path utilized by the QA system.

16. The computer program product of claim 15 wherein the actions further comprise:
   accessing a structured database from the corpus of knowledge, wherein the structured database is included in the corpus of knowledge and facilitates searching for one or more possible answers to the one or more predicted questions using the runtime code.

17. The computer program product of claim 16 wherein the actions further comprise:
   querying the structured database to retrieve responsive information;
   utilizing the retrieved responsive information to formulate the one or more possible answers to the one or more predicted questions; and
   presenting the formulated possible answers to the user.

18. The computer program product of claim 16 wherein the actions further comprise:
   selecting a set of data sources included in the corpus of knowledge, wherein the selected set of data sources are related to a common domain of information;
   extracting a plurality of words from the set of data sources;
   calculating a domain-usage frequency for each of the plurality of words, wherein the domain-usage frequency is the frequency that each of the plurality of words occurs in the set of data sources;
   retrieving a general-usage frequency for each of the plurality of words, wherein the general-usage frequency is the frequency that each of the plurality of words occurs in general language usage;
   for each of the plurality of words, comparing the domain-usage frequency of the word with the general-usage frequency of the word;
   identifying a set of the plurality of words from the plurality of words as the plurality of key words, the identifying based on the comparison revealing that the domain-usage frequency corresponding to each word in the set of the plurality of words is statistically significantly higher than the general-usage frequency corresponding to the respective word;
   searching a plurality of schemas corresponding to the structured database for the plurality of key words;
   finding a selected one of the key words in a selected one of the schemas, wherein the selected schema corresponds to a selected database table included in the structured database; and
   building the initial structured query language expression to search for the selected key word in the selected database table.

19. The computer program product of claim 15 wherein the actions further comprise:
   presenting the generated natural language question to the user at a user interface (UI); and
   receiving the one or more edits, at the UI, from the user to the generated natural language question.

20. The computer program product of claim 15 wherein the corpus of knowledge includes a first corpus that relates to a first domain of knowledge and a second corpus that relates to a second domain of knowledge, wherein the key words include a first set of key words related to the first corpus and second set of key words related to the second corpus, and wherein the first and second sets of key words differ between the two domains.

* * * * *